United States Patent [19]

Härtwig

[11] Patent Number: 4,687,177

[45] Date of Patent: Aug. 18, 1987

[54] DEVICE FOR ADJUSTING THE SWITCHING TIME OF A VALVE MEMBER

[75] Inventor: Manfred Härtwig, Ostfildern, Fed. Rep. of Germany

[73] Assignee: Mannesmann Rexroth GmbH, Fed. Rep. of Germany

[21] Appl. No.: 872,179

[22] Filed: Jun. 9, 1986

[30] Foreign Application Priority Data

Jun. 10, 1985 [DE] Fed. Rep. of Germany ....... 3520745

[51] Int. Cl.$^4$ .......................................... F16K 31/122
[52] U.S. Cl. ....................................... 251/25; 91/443; 137/513.5; 137/538; 137/614.17; 251/207
[58] Field of Search ............... 91/443; 137/513.5, 538, 137/614.17; 251/25, 207

[56] References Cited

U.S. PATENT DOCUMENTS

| 535,813 | 3/1895 | Cooper et al. | 137/614.17 X |
| 3,558,100 | 1/1971 | Hulsey | 251/207 |
| 3,595,265 | 7/1971 | Cryder et al. | 137/513.5 |
| 3,623,509 | 11/1971 | Sesseler et al. | 137/513.5 X |
| 3,631,888 | 1/1972 | Anton et al. | 137/513.5 X |
| 3,683,959 | 8/1972 | Tsuji et al. | 137/513.5 X |
| 3,938,777 | 2/1976 | Foster et al. | 137/513.5 X |
| 4,022,113 | 5/1977 | Blatt | 137/513.5 X |
| 4,588,163 | 5/1986 | Christensen | 137/538 X |

FOREIGN PATENT DOCUMENTS 2523667 12/1976 Fed. Rep. of Germany .

Primary Examiner—Gerald A. Michalsky
Attorney, Agent, or Firm—Harness, Dickey & Pierce

[57] ABSTRACT

The switching time in opening and closing a valve is determined by a closing throttle and an opening throttle which both together are arranged in series with a check valve. For closing the valve the check valve is opened thus making the opening throttle ineffective so that the closing speed is solely determined by the cross-section of the closing throttle. For opening the valve the check valve is closed so that the control pressure is decreased across the opening throttle defining a desired opening speed.

10 Claims, 2 Drawing Figures

DEVICE FOR ADJUSTING THE SWITCHING TIME OF A VALVE MEMBER

DESCRIPTION

1. Field of the Invention

The present invention relates to a device for adjusting the switching time of a valve member.

2. Background of the Invention

The prior art provides for means delaying the control pressure increase in the control chamber for closing a valve to be operated as well as for delaying the pressure decrease for the opening. Conventionally fixedly adjusted throttle orifices are utilized, further adjustable throttling means and gap orifices for very high pressure differences in which throttling is effected in an annular gap. For opening and closing the valve one throttle each is necessary both provided in parallel, wherein a check valve each is provided in each throttle branch.

SUMMARY OF THE INVENTION

It is an object of the present invention to improve the prior art types of valve devices for adjusting the switching time of a valve and to achieve a more economical valve device which is versatile in its use.

The improvements achieved by the present invention are obtained by an apparatus incorporating the features set forth in the claims.

For opening the valve to be switched the pressure prevailing in the control chamber must be released. To do this the control valve is actuated so that the control chamber of the valve is connected to the reservoir via the throttle valve. The valve member then displaces fluid from the control chamber. The pressure decrease takes place across the annular gap of the throttle valve. In the opening operation a high pressure difference between the control chamber of the valve and the drawing-off side of the fluid prevails. The switching time for opening is adjustable by controlling the annular gap.

For the closing operation the control valve is actuated so that control pressure engages the piston of the throttle valve and displaces the piston until the pressurized fluid is freely admitted to the line leading to the control chamber of the valve. Consequently the annular gap becomes ineffective. The closing time is solely adjusted by the closing throttle which is provided in the conduit leading to the control chamber which closing throttle has a relatively large cross-sectional area in contrast to the cross-sectional area of the annular gap effective for the opening operation. This means that the closing throttle does not substantially interfere with the opening operation.

While a high pressure difference exists in opening the valve between the control chamber and the working chamber of the valve on the face remote of the control chamber, a small pressure difference only exists between the control chamber and the working chamber in closing the valve, i.e. the pressure difference which results from the closing spring of the valve. This is particularly true when the pressure upstream of the valve to be switched is used as control pressure.

The high variation in pressure difference for closing and opening makes it possible to provide both throttle orifices in series without substantially interfering with each other. Accordingly the cross-section of the closing throttle is a multiple larger than that of the opening throttle. With the orifices provided in series, a single check valve is sufficient.

As throttle valve a check valve may be used which allows a flow of control fluid from the control chamber via throttle orifices (opening throttle) towards reservoir against its blocking direction. Very high pressure differences, however, require a throttle incorporating a gap.

According to the invention a preferred embodiment is disclosed which combines the closing throttle, the opening throttle in form of an annular gap and the check valve in an integral throttle valve device. According to the invention this valve device provides for an adjustable annular gap and for adjustable closing throttles.

DETAILED DESCRIPTION

Figure 1:
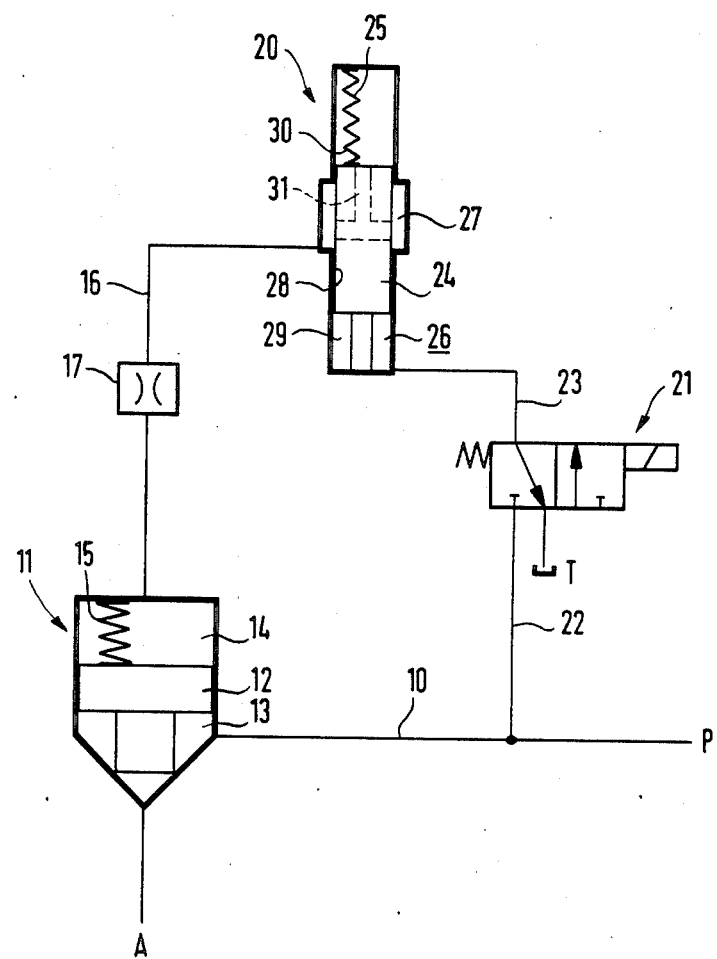
FIG. 1 is a schematic view of a valve device for adjusting the switching time of a directional valve according the the invention and FIG. 2 is a sectional view of an integral throttle valve.

FIG. 1 shows a 2/2-directional valve 11 in a line 10 leading from a pressure source P to a load A. The valve 11 comprises a valve member 12 seperating a working chamber 13 from a control chamber 14 in which a closing spring 15 is provided.

For closing the valve 11 pressurized fluid is applied to the control chamber 14 via a line 16 including a throttle orifice 17 and a throttle valve 20 and a control valve 21. The pressurized fluid is received from the pressure line 10 via a line 22, while the control valve 21 is in a switched position not shown. The fluid from line 23 urges the piston 24 of the throttle valve 20 back against the force of the spring 25 until the fluid flows from the chamber 26 to an annular chamber 27 in the valve housing surrounding the piston 24 and from there into the line 16. Fluid flow restriction then occurs only at the throttle orifice 17 whose cross-section determines the pressure increase in the control chamber 14 and thus the closing speed of the valve member 12.

For opening the valve 11 the control valve 21 is switched to the position shown thus connecting the chamber 26 to the reservoir T. Accordingly the piston 24 is urged by the spring 25 in to the position shown. The pressurized fluid in the control chamber 14 is urged into the line 16 as the valve member 12 opens. The pressure decrease takes place in an annular gap 28 which is provided between the piston 24 and the valve bore 29 of the throttle valve. Accordingly the check valve is closed and the fluid is throttled across the annular gap 28 which determines the opening speed of the valve 11.

For pressure compensation the piston 24 includes bores 31 connecting the spring chamber 30 to the annular chamber 27.

Figure 2:
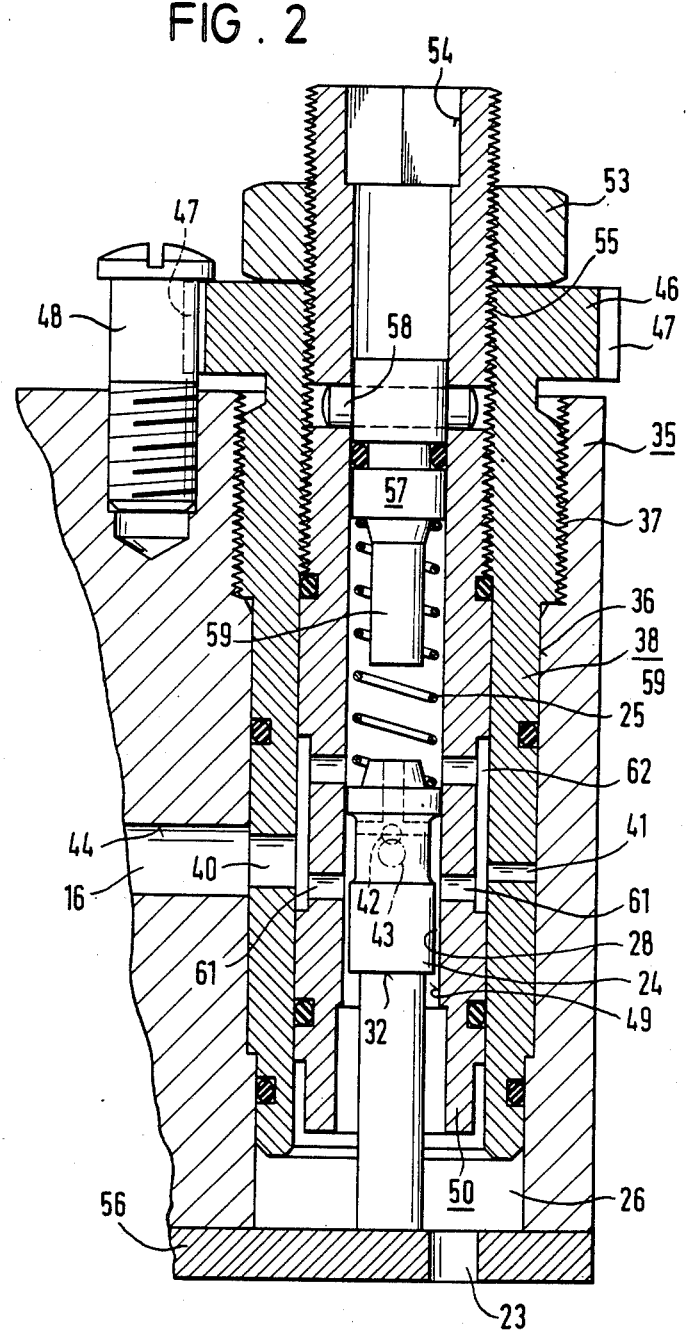

FIG. 2 shows a sectional view through an integrated valve combining the check valve and both throttle means. A valve housing 35 has a bore 36 which is provided with a thread 37 into which a sleeve 38 is screwed. The periphery of the sleeve 38 has a number of radial bores of different diameters equally spaced, for example each bore offset under an angle of 90°. FIG. 2 shows bores 40 and 41 located in opposition with each other, while the remaining bores 42 and 43 are located normally thereto. The bores 40 to 43 each define a throttle orifice corresponding to the throttle 17 in FIG.

1, wherein the desired bore by rotating sleeve 38 is brought into alignment with the line 16 or, respectively, with a channel 44 connected to the line 16 which leads to the control chamber of the valve to be actuated. To fix the sleeve 38 in the desired position the upper edge of the sleeve includes a flange 46 which has lateral slots 47 which is engaged by a screw 48 which is threaded into the housing 35. After removing the screw 48 the sleeve 38 may be rotated around 90° each and is then fixed by the screw 48. Thus the cross-section of the closing throttle orifice is adjustable, wherein the smallest bore effects the longest closing time, whereas the bore 40 for example has a cross-section practically free of any throttling effect so that the valve immediately closes.

The annular gap 28 defining the opening throttle is provided between the piston 24 and the inner bore 49 of a cylinder 50 which is axially adjustably provided within the sleeve 38. The throttling cross-section is determined by the axial length of the annular gap 28 as well as by the dimensions of the annular gap. The length of the annular gap is adjustably by axially shifting the cylinder 50. For this the counter-nut 53 is removed and the cylinder 50 is rotated by a key engaging the hexagonal socket 54. The thread 55 between the cylinder 50 and the sleeve 38 allows to adjust the length of the annular gap 28.

The spring 25 urging the piston 24 into contact with the housing cover 56 serving as an abutment is supported on a spring holder 57 which is connected to the cylinder 50 by a pin 58. The spring holder 57 includes a projection 59 defining an abutment for the piston 24 when the piston is lifted by applying pressure to the chamber 26 via a port to which line 23 is connected. When the piston is in contact with the projection 59 the fluid may freely flow from the chamber 26, through the bores 61, the annular chamber 62 and one of the closing throttles 40,41,42 or 43 to the channel 44.

When the valve 11 shown in FIG. 1 is to be opened, the fluid displaced therefrom by its valve member flows through the line 16, the channel 44, one of he closing throttles 40 to 43, the annular chamber 62, the bores 61, across the annular gap 28 to the pressure relieved chamber 26. The opening time is defined by the throttling effect across the annular gap 28 which is adjustable as explained above. In the embodiment shown the cylinder 50 may be threaded into the sleeve 38 downwardly until the annular gap 28 is out of being effective so that the bores 61 are directly connected to the chamber 26. In this case the valve opens at once.

The annular gap allows a very high throttling grade. This enhances the danger that the annular gap is contaminated by dirty particles resulting in an increase of throttling until the flow of fluid is eventially block off. Therefore each closing operation provides for a flushing of the annular gap.

Control pressure is applied to the chamber 26 for closing the valve 11. This causes lifting the piston 24 against the force of the spring 25 until the piston contacts the projection 59. Accordingly the piston is totally displaced out of the annular gap and the fluid from the chamber 26 freely enters the bores 61 below the piston 24 and flows into the annular space 62 from which it is fed through the bore to which the sleeve has been adjusted to the channel 44 and to the control chamber of the valve to be operated. Since the annular gap is totally opened with each closing operation, any dirt and contamination is flushed off.

The opening speed is continuously adjustable, whereas the closing speed is selected in a number of steps. The adjustment is easily made externally in a very simple mode. The sleeve 38 can be omitted where inserting a removable jet orifice in the valve housing 35 is sufficient. Provided the pressure differences to be governed are not very high the throttle provided by the annular gap may be replaced by a throttle defined by a groove for example. An axial groove is then provided on the piston 24.

I claim:

1. A device for adjusting the switching time of a valve comprising an inlet port, an outlet port, a valve member for connecting the inlet port to the outlet port in one position of said valve member and for isolating said inlet port from said outlet portion when said valve member is in another position and a control chamber selectively connected via throttle orifices and a control valve to a control pressure source for urging said valve member to one of its positions or to a reservoir for permitting said valve member to move to the other of its positions, characterized in that a conduit extends from said control valve to said control chamber, a first throttle of relatively large effective cross-section area for controlling the flow in one direction in said conduit and a second throttle in said conduit connected in series with said first throttle, said second throttle being movable from a first position in which said second throttle has a relatively small cross-sectional area for controlling the effective cross-sectional area of said conduit means when said control valve is in one position and a second position wherein said second throttle is substantially unrestricted when said control valve is in a second position wherein said first throttle determines the effective cross-sectional area of said conduit.

2. The device of claim 1, wherein the second throttle small cross-sectional area is defined by an annular gap between a piston and a supporting bore of a throttle valve housing and wherein the piston is displaceable by the control pressure from its first position to a second position so that a passage is opened between a control portion of said piston and a space in the valve housing connected to a reservoir of low pressure.

3. The device of claim 2, wherein the first throttle is defined by the cross-sectional area provided between the control portion of the piston and bores in the valve housing.

4. The device of claim 2, wherein the piston is displaceably supported in a cylinder which is adjustable with respect to the valve housing for adjusting the axial length of the annular throttle gap.

5. The device of claim 4, wherein the piston is urged by a spring into contact with a stationary abutment and wherein the control pressure is effective against the force of said spring in a space in which the abutment is provided.

6. The device of claim 5, wherein an abutment is provided adjacent said spring for limiting the opening stoke of the piston.

7. The device of claim 4, wherein the cylinder is provided in a sleeve having at its periphery a plurality of radial bores each defining an orifice of said first throttle, said sleeve being rotatable with respect to said valve housing to connect one of said bores to a channel leading to the control chamber of the valve to be operated.

8. The device of claim 7, wherein said sleeve includes a flange provided at its periphery with spaced grooves and wherein the rotational position of said sleeve is adjustable by a screw engageable in a selected one of said grooves.

9. The device of claim 2, wherein the piston includes a portion defining the length of said annular gap.

10. The device of claim 1, in combination with a control valve for selectively applying control pressure to said control chamber.

* * * * *